US011700527B2

(12) United States Patent
Gundavelli et al.

(10) Patent No.: US 11,700,527 B2
(45) Date of Patent: Jul. 11, 2023

(54) COLLABORATIVE DEVICE ADDRESS ROTATION

(71) Applicant: Cisco Technology, Inc., San Jose, CA (US)

(72) Inventors: Srinath Gundavelli, San Jose, CA (US); Stephen Michael Orr, Wallkill, NY (US); Shree N. Murthy, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 74 days.

(21) Appl. No.: 17/329,843

(22) Filed: May 25, 2021

(65) Prior Publication Data
US 2022/0386110 A1    Dec. 1, 2022

(51) Int. Cl.
*H04W 8/26*    (2009.01)
*H04W 12/69*   (2021.01)
(Continued)

(52) U.S. Cl.
CPC ......... *H04W 8/265* (2013.01); *H04L 61/5046* (2022.05); *H04W 12/041* (2021.01); *H04W 12/06* (2013.01); *H04W 12/69* (2021.01)

(58) Field of Classification Search
CPC .............................. H04W 84/12; H04W 12/04
(Continued)

(56) References Cited

U.S. PATENT DOCUMENTS 11,128,661 B2 *   9/2021   Li ..................... H04W 12/71
2005/0033960 A1 * 2/2005   Vialen ................. H04L 63/123
                                                    713/170
(Continued)

FOREIGN PATENT DOCUMENTS

WO    2017026930 A1    2/2017

OTHER PUBLICATIONS

Henry, J., et al., "Randomized and Changing MAC Address Use Cases, draft-henry-madinas-framework-02" Internet Engineering Task Force, Internet-Draft, Intended status: Informational, https://www.ietf.org/archive/id/draft-henry-madinas-framework-02.txt. May 3, 2021, 13 pages.
(Continued)

*Primary Examiner* — Kiet M Doan
(74) *Attorney, Agent, or Firm* — Edell, Shapiro & Finnan, LLC (57) ABSTRACT

Embodiments are presented for collaborative device address generation between a wireless client device and a network infrastructure component, such as a wireless access point. The wireless client device and network infrastructure component share information to facilitate collaborative generation of a sequence of device addresses. This shared information includes, in some embodiments, key information and moving factor information. The key information and moving factor information is used to generate a token. A sequence of tokens is generated by updating the moving factor as each token is generated. A corresponding sequence of device addresses are then derived based on the sequence of tokens. Since the wireless client device and the network infrastructure device apply equivalent methods to generate respective sequences of addresses, the network infrastructure is able to efficiently identify a source wireless client device when observing a new device address on a wireless network.

20 Claims, 7 Drawing Sheets

(51) Int. Cl.
*H04W 12/041* (2021.01)
*H04W 12/06* (2021.01)
*H04L 61/5046* (2022.01)

(58) Field of Classification Search
USPC .......................... 455/456.1, 456.2; 340/5.61
See application file for complete search history.

(56) References Cited

U.S. PATENT DOCUMENTS

| | | | |
|---|---|---|---|
| 2015/0040195 | A1 | 2/2015 | Park et al. |
| 2016/0135053 | A1 | 5/2016 | Lee et al. |
| 2016/0295409 | A1 | 10/2016 | Lee et al. |
| 2019/0246268 | A1 | 8/2019 | Walker et al. |
| 2020/0351648 | A1 | 11/2020 | Fang |
| 2021/0360465 | A1 | 11/2021 | Henry et al. |
| 2021/0367872 | A1 | 11/2021 | Huang et al. |
| 2022/0053021 | A1* | 2/2022 | Li ....................... H04L 63/1475 |
| 2022/0086627 | A1 | 3/2022 | Montemurro et al. |
| 2022/0264300 | A1* | 8/2022 | Nix ....................... H04L 9/0841 |

OTHER PUBLICATIONS

Aura, T., Microsoft Research, RFC 3972: Cryptographically Generated Addresses (CGA), Network Working Group, Request for Comments: 3972, Category: Standards Track, https://www.rfc-editor.org/rfc/rfc3972, Mar. 2005, 22 pages.

Orr, S., Cisco, "Advancements in Wireless Security," Its about time, BRKEWN-2006, Jan. 27-31, 2020, Yetrieved Jul. 7, 2022, 119 pages.

Noh, J., et al., "Secure Authentication and Four-Way Handshake Scheme for Protected Individual Communication in Public Wi-Fi Networks," IEEE Access, vol. 6, published Mar. 12, 2018, 10 pages.

"eTutorials.org, "Key Management," retrieved from http://etutorials.org/Networking/Wireless+lan+security/Chapter+8.+WLAN+Encryption+and+Data+Integrity+Protocols/Key+Management/#ch08lev3sec15, Jul. 19, 2022, 6 pages."

IEEE SA Standards Association, IEEE Standard for Information Technology—Telecommunications and Information Exchange between Systems Local and Metropolitan Area Networks—Specific Requirements, "Part 11: Wireless LAN Medium Access Control (MAC) and Physical Layer (PHY) Specifications," Dec. 3, 2020, pp. 1-2000 (Part 1).

IEEE SA Standards Association, IEEE Standard for Information Technology—Telecommunications and Information Exchange between Systems Local and Metropolitan Area Networks—Specific Requirements, "Part 11: Wireless LAN Medium Access Control (MAC) and Physical Layer (PHY) Specifications," Dec. 3, 2020, pp. 2001-4379 (Part 2).

\* cited by examiner

COLLABORATIVE DEVICE ADDRESS ROTATION

TECHNICAL FIELD

The present disclosure relates to secure wireless networking.

BACKGROUND

In an effort to improve privacy of a mobile device user, many mobile operating systems are periodically changing (or "rotating") a device address (e.g. a station address) used to identify a mobile device on a wireless network. By changing the device address, it can be more difficult for an eavesdropper to track a location of a mobile device user, but also, in some circumstances, more difficult to monitor their online activities. For example, an eavesdropper will be unable to associate a device with a particular user based on packet captures at different locations of a network, different layer two/layer three traffic flows from or to the mobile device, or at different times. While rotation of a wireless device's address can improve privacy, much of the legacy wireless network infrastructure was not designed to accommodate such address rotation, and in many cases, uses the device address as an identifier of the wireless device for a variety of processing.

DESCRIPTION OF EXAMPLE EMBODIMENTS

Overview

Disclosed herein are embodiments for collaborative generation of device addresses by a wireless client device and a network infrastructure component, such as an access point. In one aspect, a method includes exchanging a first network message with a wireless client device. The first network message indicates parameters to be provided as input to a deterministic computation function. The deterministic computation function is, in some embodiments, a one-time password (OTP) function or a hash message authentication code (HMAC) OTP function, or any one-time password/token generator that relies upon a cryptographic algorithm. The method also includes generating a sequence of device addresses (e.g. media access control (MAC) station addresses) using the deterministic computation function. Each of the device addresses in the sequence is generated based on a first of the indicated parameters. The generation of each device address is also based on one of the indicated parameters that is unique to the device address. A sequence of second network messages is received. The sequence indicates a corresponding sequence of source addresses. Each of the source addresses in the sequence is then compared to at least one device address in the sequence of device addresses. Based on the comparisons, a determination is made that each message in the sequence of second network messages originated with the wireless client device.

Example Embodiments

The present disclosure provides a new approach to device address rotation. In particular, with the disclosed approach, a wireless client device, in conjunction with a network infrastructure component, such as an access point, generates tokens based on shared cryptographic material (e.g., a key), and a moving factor. The moving factor in one embodiment is an indication of a time of day and optionally a date, and in another embodiment, is a counter value. The key, in one embodiment, is a master session key (MSK), or a key based on an MSK that is derived from an access authentication process.

In some embodiments, the wireless client device rotates its device address on a periodic basis, or at a fixed interval in at least some embodiments. In embodiments where the moving factor is based on a time of day and/or date, a fixed interval between device address rotations provides for alignment between the moving factor used for the generation of a device address and the time of the rotation itself. In some embodiments, the periodicity of rotation is randomized to some extent. For example, the periodicity of rotation is set to a first elapsed time between rotations, and a random component is introduced such that the periodicity varies by a percentage (e.g. 5%, 10% variation, etc).

Some other embodiments rotate the device address according to a count of a number of bytes, packets, or messages exchanged between the wireless client device and a network infrastructure device, such as an access point. In some embodiments, the count includes data exchanged in both directions. In some other embodiments, the count includes data exchanged in a single direction. To the extent a count maintained by the network infrastructure device and separately by a wireless client device become different (e.g., due to dropped packets), since both the network infrastructure device and the wireless client device are able to predict a next deice address in a sequence of device addresses, synchronization between the two devices is still maintained.

Since the network infrastructure is utilizing an equivalent method to generate a sequence of device addresses, the network infrastructure is able to predict a next address to be used by the wireless client device. Alternatively, when the network infrastructure receives a message indicating a previously unknown source address, the network infrastructure is able to determine whether the message originated with a wireless client device already known by the network infrastructure.

In various embodiments, token generation is performed using an OTP algorithm, or a HMAC OTP algorithm, or another method of cryptographic token generation. The method used guarantees that tokens have no relation to each other. In other words, an observer detecting a particular client's device address that is generated via the disclosed methods will not be able to identify a relation to any other device address used by the particular client. In other words, tokens generated by these embodiments generally do not have any detectable relation to each other. The algorithm selected for token generation should be selected so as to achieve this result.

In these embodiments, the generated token is used to generate a unique device address. The network infrastructure component and the wireless client device utilize an equivalent token generator algorithm that operates on the same input parameters (e.g., key, factor) and thus generate equivalent tokens. These embodiments use the generated tokens to then generate a device address (e.g., a 48-bit MAC address with scope bit set to "Local" usage). The "L (local)" bit in a first octet of a generated MAC address is set to a value, to indicate it is a locally generated address. Use of locally generated MAC addresses avoids collisions with stable MAC addresses, which generally do not have their local bit set. One advantage of the disclosed approach is that it provides an ability for the network infrastructure to predict the device addresses that the wireless client device will generate.

In the disclosed approach, a wireless client device attaches to a wireless local area network (WLAN) and performs access authentication. An initial device address used for the access authentication is, in some embodiments, generated without any coordination between the wireless client device and the network infrastructure. In some embodiments, the network infrastructure and wireless client device exchange a capability flag during access authentication. The capability flag indicates whether each of the wireless client device and/or wireless infrastructure component (e.g., an access point) support the disclosed methods for device address generation. In some embodiments, after access authentication is complete, the network infrastructure and the wireless client device exchange a common key and a moving factor. The key and moving factor are used to generate a sequence of tokens (one token per moving factor value). In some embodiments of the disclosed approach, cryptographic material needed for token generation is securely exchanged as part of access authentication. In some embodiments, the moving factor and/or a trigger to rotate is signaled over an extensible authentication protocol (EAP) or any other access authentication protocol.

Figure 1:
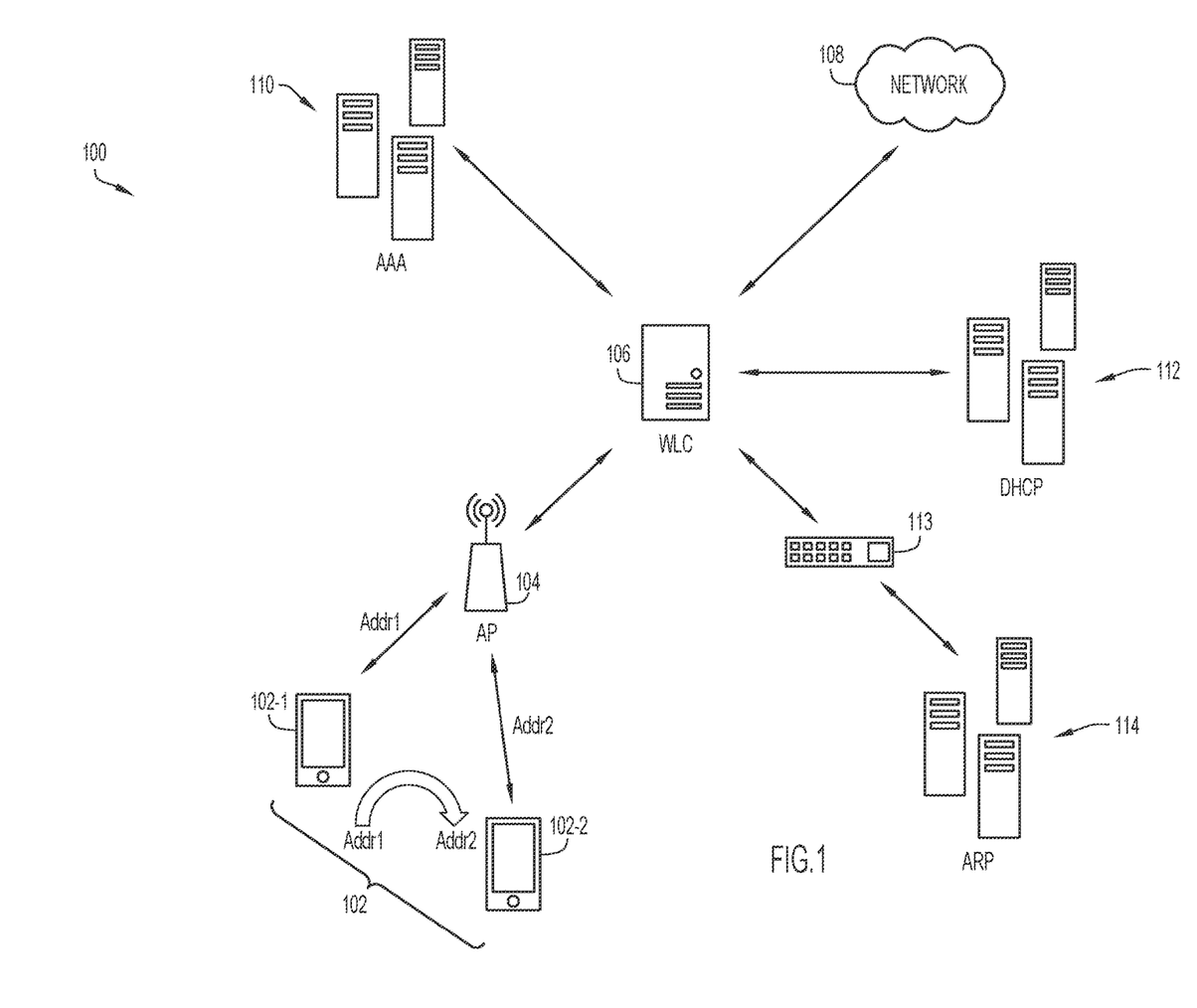
FIG. 1 is an overview diagram illustrating a network environment in accordance with an example embodiment.

FIG. 1 is an overview diagram illustrating a network environment 100 in accordance with an example embodiment. FIG. 1 includes a wireless client device 102 in communication with an access point (AP) 104. The wireless client device 102 is shown rotating or otherwise modifying a device address that identifies the wireless client device 102 to the AP 104 and to other devices on a wireless network. A first image 102-1 of the wireless client device 102 represents the wireless client device 102 when the wireless client device 102 is identified via a first device address. A second image 102-2 of the wireless client device 102 represents the wireless client device 102 when it is identified via a second device address. The AP 104 is in communication with a wireless network controller (WLC) 106. The wireless network controller 106 communicates with a network 108. Thus, FIG. 1 shows a communication path is established between the wireless client device 102 and the network 108 via the AP 104 and wireless network controller 106.

FIG. 1 also illustrates an authentication, authorization, and accounting (AAA) server 110 in communication with the wireless network controller 106. A dynamic host control protocol (DHCP) server 112 is also in communication with the wireless network controller 106. A router 113 provides network connectivity between the wireless network controller 106 and an address resolution protocol (ARP) server 114. The AAA server 110 provides authentication services for the wireless client device 102, and in some cases, maintains a mapping of authentication information established by the wireless client device 102 and a device address of the wireless client device 102. Thus, a rotation of a device address of the wireless client device 102 presents a potential to disrupt the mapping maintained by the AAA server 110. Similarly, the DHCP server 112 maintains a mapping between the wireless client device 102 device address and an Internet Protocol (IP) address. Thus, rotation of the device address of the wireless client device 102 threatens to disrupt the mapping cached or otherwise stored by the DHCP server 112. The ARP server 114 maintains, in some cases, a mapping between a device address of the wireless client device 102 and an IP address. Additionally, one or more routers and/or wireless client devices cache ARP information (e.g. mappings from IP address to device address). Thus, when the wireless client device changes its device address via address rotation, a mapping maintained by the ARP server 114 or any other devices that caches an ARP mapping, n at least some circumstances, becomes obsolete, because it references a previously used device address of the wireless client device 102.

As discussed above, the present disclosure describes an approach to device address rotation such that the wireless client device 102 and the AP 104 are able to generate equivalent sequences of device addresses that are then used to identify the wireless client device 102 on the wireless network. Since the wireless client device 102 and the AP 104 utilize equivalent methods and apply those methods to equivalent data, the AP 104 is able to determine that, upon receiving a previously unseen device address, the device address originated from the wireless client device 102. Details of this approach are discussed further below.

Figure 2:
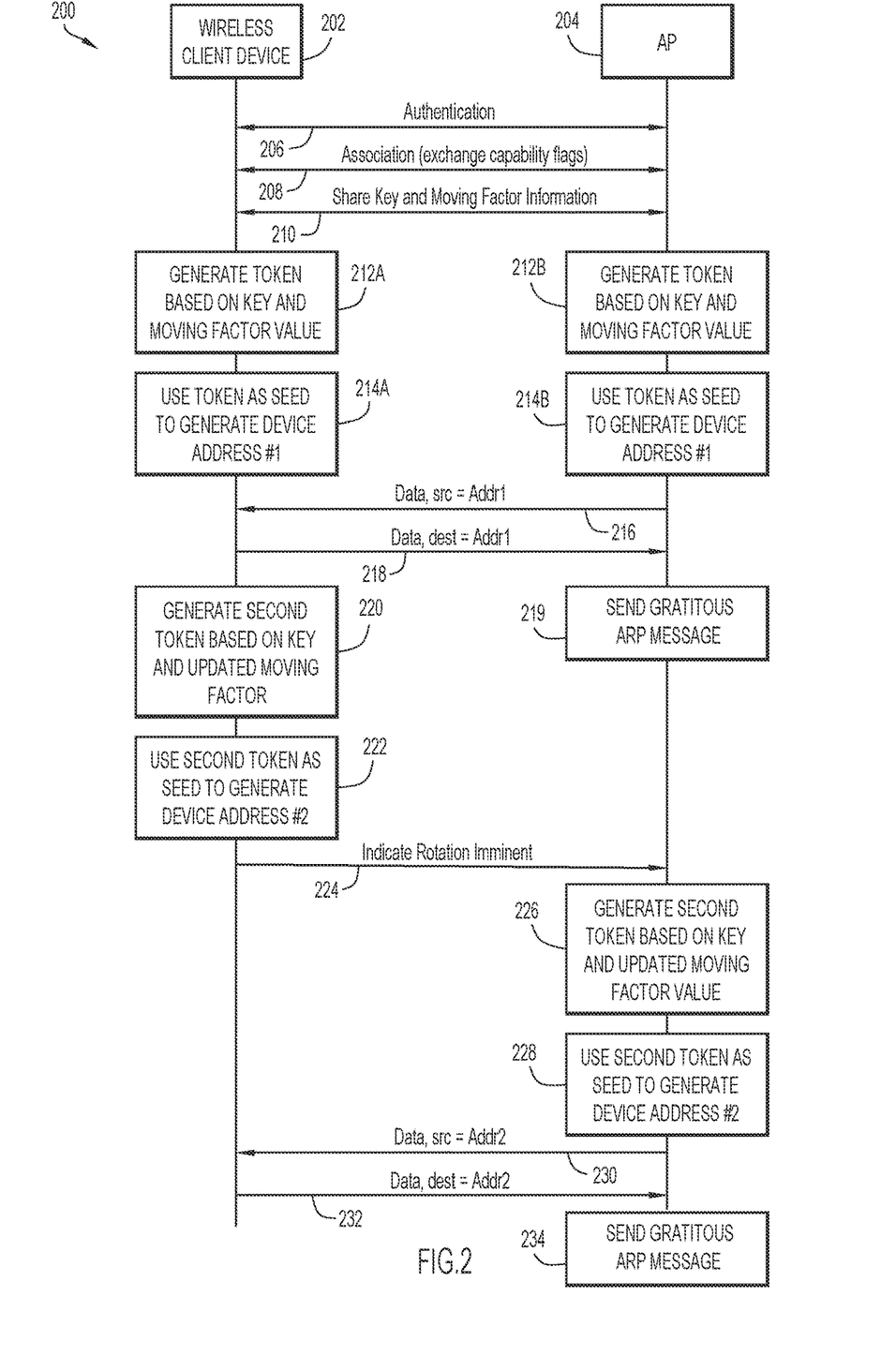
FIG. 2 is a sequence diagram illustrating rotation of a device address in accordance with an example embodiment.

FIG. 2 is a sequence diagram 200 illustrating rotation of a device address in accordance with an example embodiment. FIG. 2 shows a wireless client device 202 and an AP 204. The wireless client device 202 and the AP 204 participate in an authentication message exchange 206. In some embodiments, the authentication message exchange 206 implements an Extensible Authentication Protocol (EAP) authentication. The wireless client device 202 and the AP 204 then perform an association message exchange 208. The association message exchange 208 includes, for example, the wireless client device 202 sending an association request message to the AP, which requests the association. The AP 204 then responds with an association response message. As part of the association message exchange, the wireless client device 202 and the AP 204 exchange capability information. For example, in some embodiments, each of the association request message and the association response message includes one or more information elements (IEs), with the IEs indicating capability information. In some embodiments, the capability information indicates whether the device sending the capability information supports device address generation and rotation according to the disclosed methods. For example, the capability information indicates, in some embodiments, whether the wireless client device 202 and/or AP 204 support generation of a device address via a key and a moving factor. In some embodiments, one or more of the wireless client device 202 and/or the AP 204 condition performance of the message sequence described below based on the capability information indicated by the other device.

FIG. 2 shows that the wireless client device 202 and the AP 204 exchange a key value and moving factor information via data exchange 210. In some embodiments, the key and moving factor information are provided by the AP 204 to the wireless client device 202. In some other embodiments, the key and moving factor information are provided by the wireless client device 202 to the AP 204. In still other embodiments, the wireless client device 202 supplies one of the values to the AP 204 and the AP 204 supplies the other of the values to the wireless client device 202. In some embodiments, the key shared between the wireless client device 202 and the AP 204 is a key that results from the authentication message exchange 206. For example, in some embodiments, the key is a master session key (MSK) or a pairwise master key (PMK) resulting from access authentication.

In some embodiments, the moving factor information shared between the wireless client device 202 and the AP 204 indicate a process or function to define a moving factor value. For example, the process or function indicates, in some embodiments, that the moving factor value is incremented or decremented by a predefined constant value before each token is generated. In some embodiments, the moving factor shared between the wireless client device 202 and the AP 204 indicates, in some embodiments, whether the moving factor value is a current time value, a current date value, or a combination of the current time value and the current date value. In some embodiments, the moving factor information defines an initial value of the moving factor.

FIG. 2 then illustrates the wireless client device 202 and the AP 204 collaboratively generating a token based on a key and a moving factor. The wireless client device 202 generates a token in step 212A and the AP 204 generates a token in step 212B. The wireless client device 202 and the AP 204 generate the token based on the shared key and the shared moving factor information. The generation of the token in step 212A and step 212B receives, as input parameters, the key and a moving factor value derived from the moving factor information. As discussed above, some embodiments use an OTP or HMAC OTP algorithm to generate the token based on the key and the moving factor.

After each of the wireless client device 202 generates a token in step 212A and AP 204 generates an equivalent token in step 212B, each of the wireless client device 202 and the AP 204 generate equivalent first device addresses (in step 214A and step 214B respectively) based on the generated token.

FIG. 2 illustrates that the wireless client device 202 then uses the generated first device address to send a data message 216. The data message 216 identifies the wireless client device 202 via the first device address (Addr1) in a source address field (src) of the data message 216. Because the AP 204 generated the first device address in step 214B, upon receiving the data message 216, the AP 204 is able to determine that the wireless client device 202 originated the data message 216. FIG. 2 also shows the AP 204 providing an inbound data message 218 to the wireless client device 202. The inbound data message 218 identifies the wireless client device 202 as a destination of the inbound data message 218 via the first device address (Addr1) in a destination address field (dest) of the inbound data message 218. FIG. 2 also shows the AP 204 transmitting, in step 219, a gratuitous ARP message in response to detecting use of the second device address by the wireless client device 202. A gratuitous ARP message is an ARP Response that was not prompted by an ARP Request. The Gratuitous ARP is generally sent as a broadcast, as a way for a node to announce or update its IP to MAC mapping to the entire network. In this case, the AP 204 sends the gratuitous ARP message to change an ARP mapping of the wireless client device 202 to reflect the new device address.

FIG. 2 then shows the wireless client device 202 generating a second token based on the key and an updated moving factor value in step 220. The wireless client device 202 generates a second device address based on the second token in step 222. Note that while FIG. 2 illustrates an embodiment that generates each token and device address as it is needed, other embodiments generate tokens and/or device addresses as a group, and then select a token and/or device address from the group as it is employed for network communication.

The wireless client device then transmits a notification message 224 to the AP 204. The notification message 224 indicates an address rotation by the wireless client device is imminent, or, in other words, will occur within a predetermined time frame. The sequence diagram 200 illustrates that in response to receiving the notification message 224, the AP 204 generates the second token based on the key and the updated moving factor value. Note that both the wireless client device 202 and the AP 204 updated the moving factor value in steps 220 and 226, respectively, according to an equivalent method or algorithm, consistent with the moving factor information exchanged between the two devices in the data exchange 210 discussed above. After generating the second token, the AP 204 generates the second device address (Addr2) in step 228. FIG. 2 then shows the wireless client device 202 sends a data message 230 that identifies the wireless client device 202 via the second device address (Addr2). The AP 204 also sends a data message 232 that identifies the wireless client device 202 as a destination of the data message 232 via the second device address. Note that data message 216 and data message 230 collectively represent a sequence of network messages, each indicating a different source address (e.g. the first device address, Add1, and the second device address, Addr2). FIG. 2 also shows the AP 204 transmitting, in step 234, a gratuitous ARP message in response to detecting use of the second device address by the wireless client device 202.

While FIG. 2 shows the AP 204 generates the second token in response to receiving the notification message 224, in other embodiments, the AP 204 may generate the second token in advance of receiving the notification message 224. Alternatively, the AP 204 may generate the second token in response to receiving a message having a previously unseen source device address, such as the data message 230.

Figure 3:
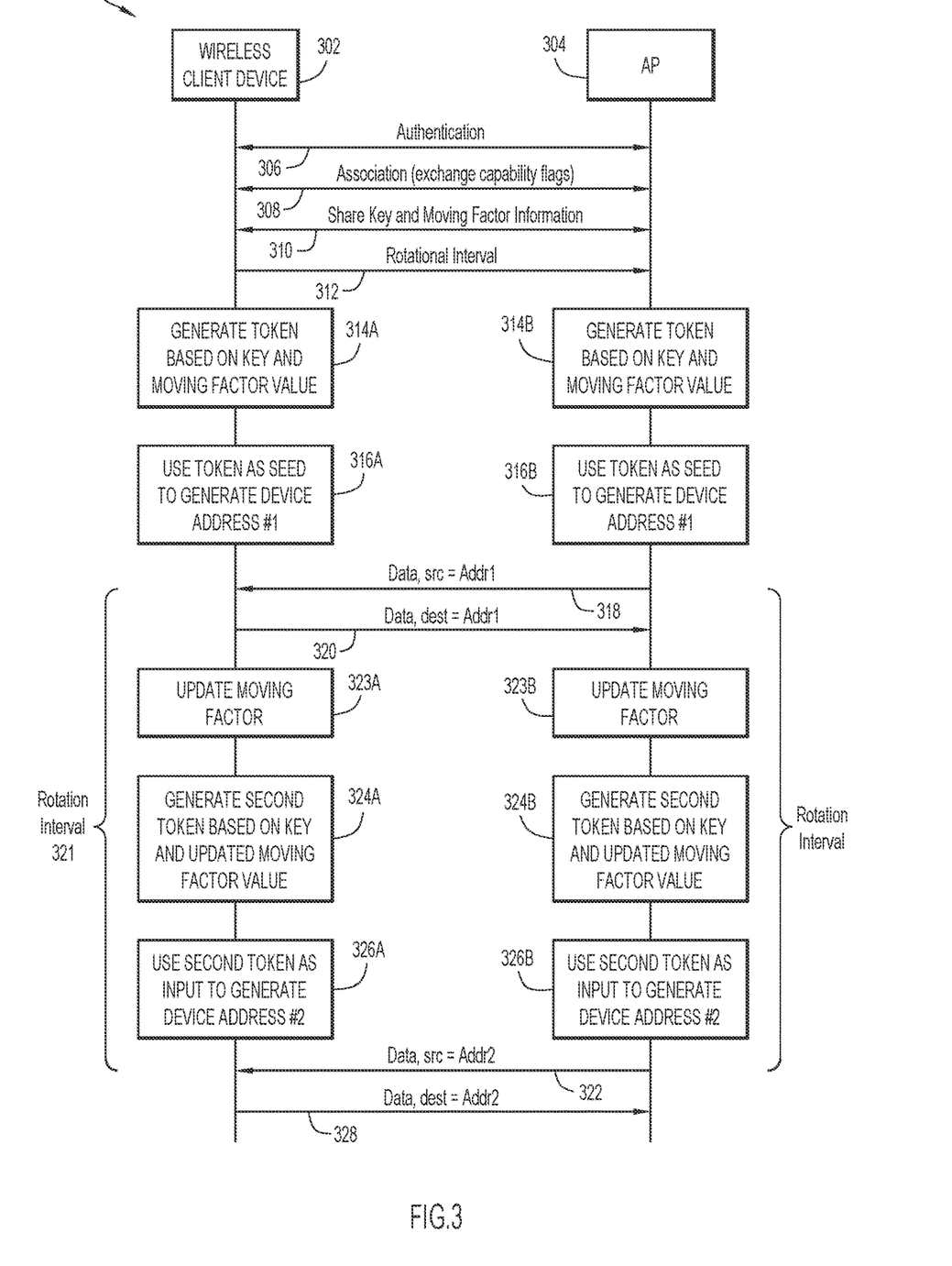
FIG. 3 is a sequence diagram showing collaborative generation of device addresses according to an example embodiment.

FIG. 3 is a sequence diagram 300 showing collaborative generation of device addresses according to an example embodiment. FIG. 3 shows a wireless client device 302 in communication with an AP 304. FIG. 3 shows the wireless client device 302 and the AP 304 performing an authentication 306. In some embodiments, the authentication 306 is an EAP authentication. After the wireless client device 302 successfully authenticates, the wireless client device 302 associates with the AP 304 via an association message exchange 308. As discussed above with respect to FIG. 2, an association includes, in at least some embodiments, an association request message send from the wireless client device 302 to the AP 304. The AP 304 responds to the association request message with an association response message, which indicates a result of the association (e.g. success or fail).

FIG. 3 then shows the wireless client device 302 and the AP 304 exchanging key information and moving factor information. In some embodiments, the key information is derived from the authentication 306. Similar to the moving factor information discussed above with respect to FIG. 2, in some embodiments, the moving factor information exchanged in data exchange 310 defines a method or process for updating the moving factor when each token is generated (e.g. incrementing/decrementing a counter, a current or global positioning system (GPS) based time value or other method).

The wireless client device 302 and AP 304 exchange rotation interval information via data exchange 312. The rotation interval information defines a periodicity of address rotation by the wireless client device 302. For example, the periodicity indicates, in some embodiments, an elapsed time or interval between successive rotations of device addresses of the wireless client device 302.

Each of the wireless client device 302 and AP 304 then generate tokens based on the shared key and moving factor information in steps 314A and 314B, respectively. Based on the generated tokens, each of the wireless client device 302 and AP 304 then generate a first device address in steps 316A and 316B, respectively.

The wireless client device 302 then sends a data message 318 that identifies the wireless client device 302 using the first device address (Addr1) in a source address field (src) of the data message 318. The AP 304 transmits an inbound data message 320 that identifies the wireless client device 302 as a destination of the inbound data message 320 by specifying the first device address (Addr1) in a destination address field (dest) of the inbound data message 320.

FIG. 3 shows that after a rotation interval 321 equivalent to that specified in the rotation information specified in the data exchange 312, the wireless client device 302 sends a second data message 322 using a newly generated second device address (Addr2). To generate the second device address, the wireless client device 302 updates the moving factor value is step 323A and then generates a second token based on the key and the updated moving factor value in step 324A. The AP 304 is also shown updating the moving factor value in step 323B and then generating a second token value based on the key and the updated moving factor value in step 324B. Note that since both the wireless client device 302 and the AP 304 utilize an equivalent method for updating the moving factor value, as defined by the moving factor information shared in the data exchange 310, both the wireless client device 302 and the AP 304 generate equivalent updated moving factor values in steps 324A and 324B. Equivalent second device addresses are collaboratively generated in steps 326A and 326B. FIG. 3 also shows the AP 304 providing an inbound data message 328 to the wireless client device 302, with the wireless client device 302 identified in the inbound data message 328 via the second device address (Addr2). Note that the data message 318 in combination with the second data message 322 represent a sequence of network messages, each of the network messages indicating a different source address (e.g. the first device address, Addr1 and the second device address, Addr2).

While FIG. 3 demonstrates use of a shared rotation interval to facilitate coordination of address rotations between the wireless client device 302 and AP 304, embodiments of the AP 304 vary in how they use the shared rotation interval to generate device addresses. For example, some APs implement a deadline scheduling approach, and ensure a next device address in a sequence of device addresses is defined prior to the next rotation (as defined by the interval). Other AP implements may generally ignore the shared rotation interval. In some of these embodiments, the AP generates a predefined number of device addresses in a sequence of device addresses in advance. As device addresses are observed by the AP, additional device addresses may be generated to maintain a predefined "buffer" of unused device addresses that are available for recognition by the AP 304 when used by the wireless client device 302.

Figure 4A:
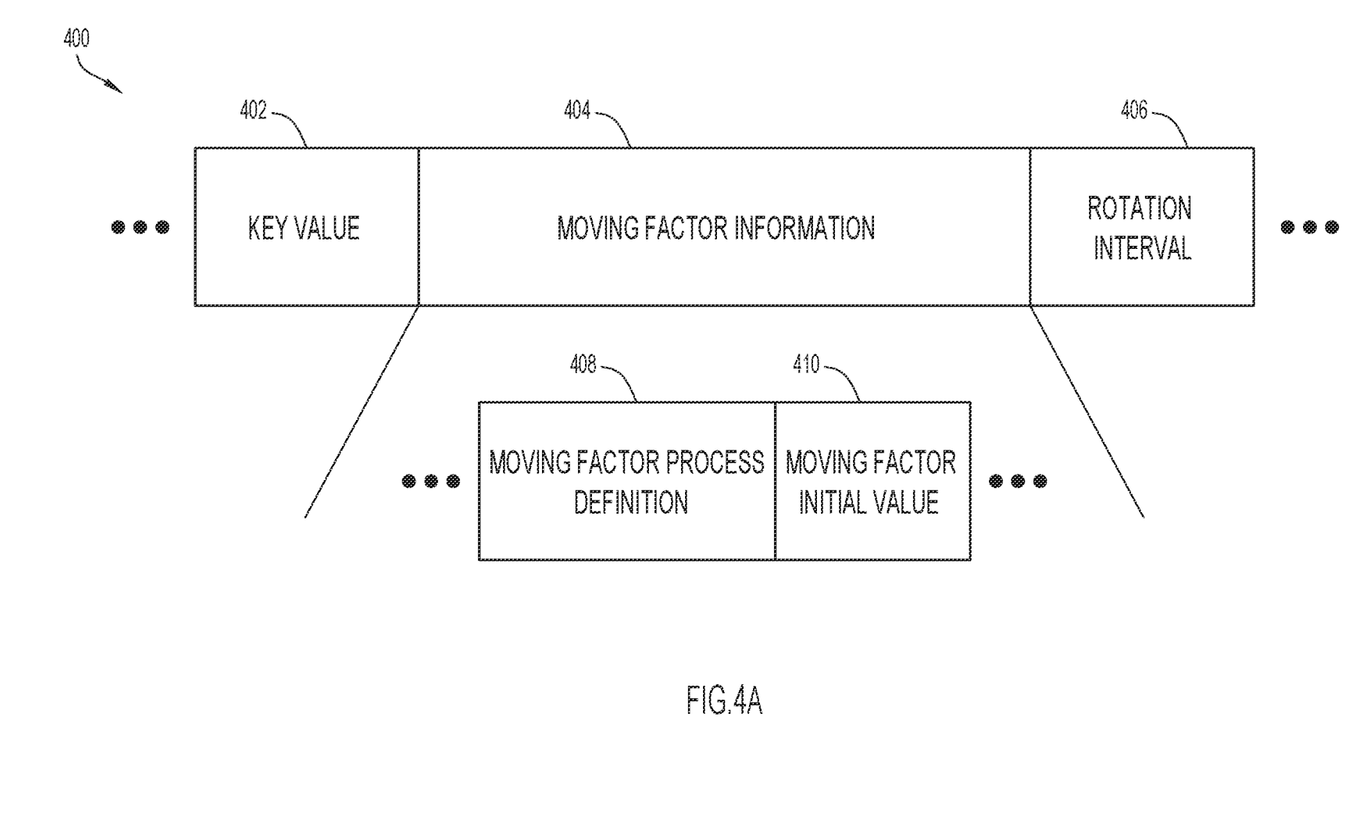
FIG. 4A is a diagram of a message portion used for sharing address rotation information between a wireless client device and a network infrastructure device according to an example embodiment.

FIG. 4A is a diagram of a message portion 400 used for sharing address rotation information between a wireless client device and a network infrastructure device according to an example embodiment. For example, in some embodiments, one or more of the data exchange 210, data exchange 310, or data exchange 312 include a message with one or more of the fields of the message portion 400 discussed below.

The message portion 400 includes a key value field 402, a moving factor information field 404, and a rotation interval field 406. The key value field 402 defines a key value used by some embodiments to generate a token, as discussed above. The moving factor information field 404 defines one or more characteristics of a moving factor (or sequence of moving factor values) used to generate a sequence of tokens. For example, as illustrated in FIG. 4A, components of the moving factor information field 404 include, for example, a moving factor update function definition 408, and/or a moving factor initial or seed value 410. The moving factor update function definition 408 defines, in some embodiments, that the moving factor is incremented or decremented by a predefined constant. In some embodiments, the moving factor update function definition 408 indicates that a time value is used to update a moving factor value. In some embodiments, the moving factor update function definition 408 defines instructions (e.g. intermediate code, source code, or script code) that implement an update function to a moving factor value. For example, in some embodiments, the instructions define a function that receives an input parameter of a previous moving factor value or initial moving factor value, and generate an output parameter indicating the updated moving factor value.

Figure 4B:
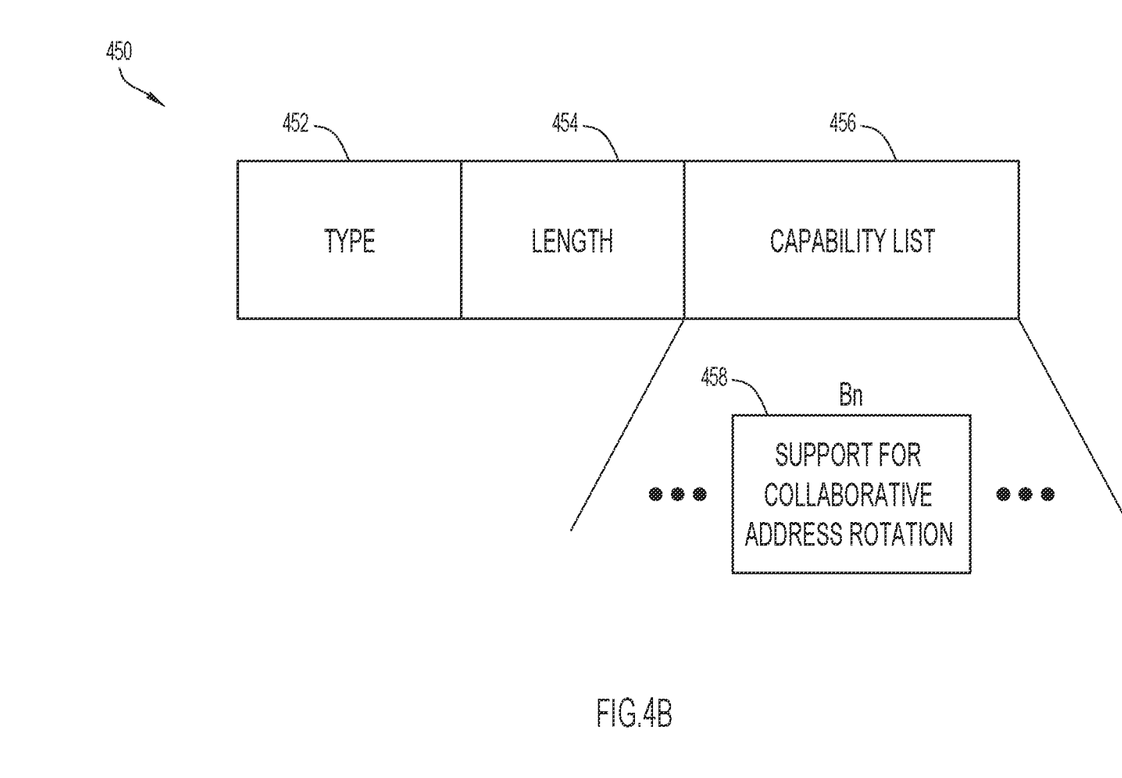
FIG. 4B is a diagram of a capabilities information element (IE) in accordance with an example embodiment.

FIG. 4B is a block diagram of a capabilities information element 450 that is used in accordance with an example embodiment. The capabilities information element 450 is exchanged, in some embodiments, between a wireless client device and an AP or other network infrastructure component to indicate whether the device transmitting the capabilities information element 450 supports collaborative device address rotation methods consistent with the embodiments presented herein. The capabilities information element 450 includes a type field 452, a length field 454, and a capabilities list field 456. The type field 452 identifies, when set to a predefined value, that the capabilities information element 450 is in fact an information element that provides a list of capabilities supported by the device transmitting the information element. The length field 454 indicates a length, in bytes of the capabilities information element 450. The capabilities list field 456 includes, in at least one embodiment, a capability indicator, such as a bit 458. The capability indicator indicates whether collaborative address rotation methods are supported by a device transmitting the capabilities information element 450. For example, if the bit is set, this indicates, in some embodiments, that such methods are supported. If the bit is clear, this indicates, in some embodiments, such methods are not supported by the device transmitting the information element.

Figure 5:
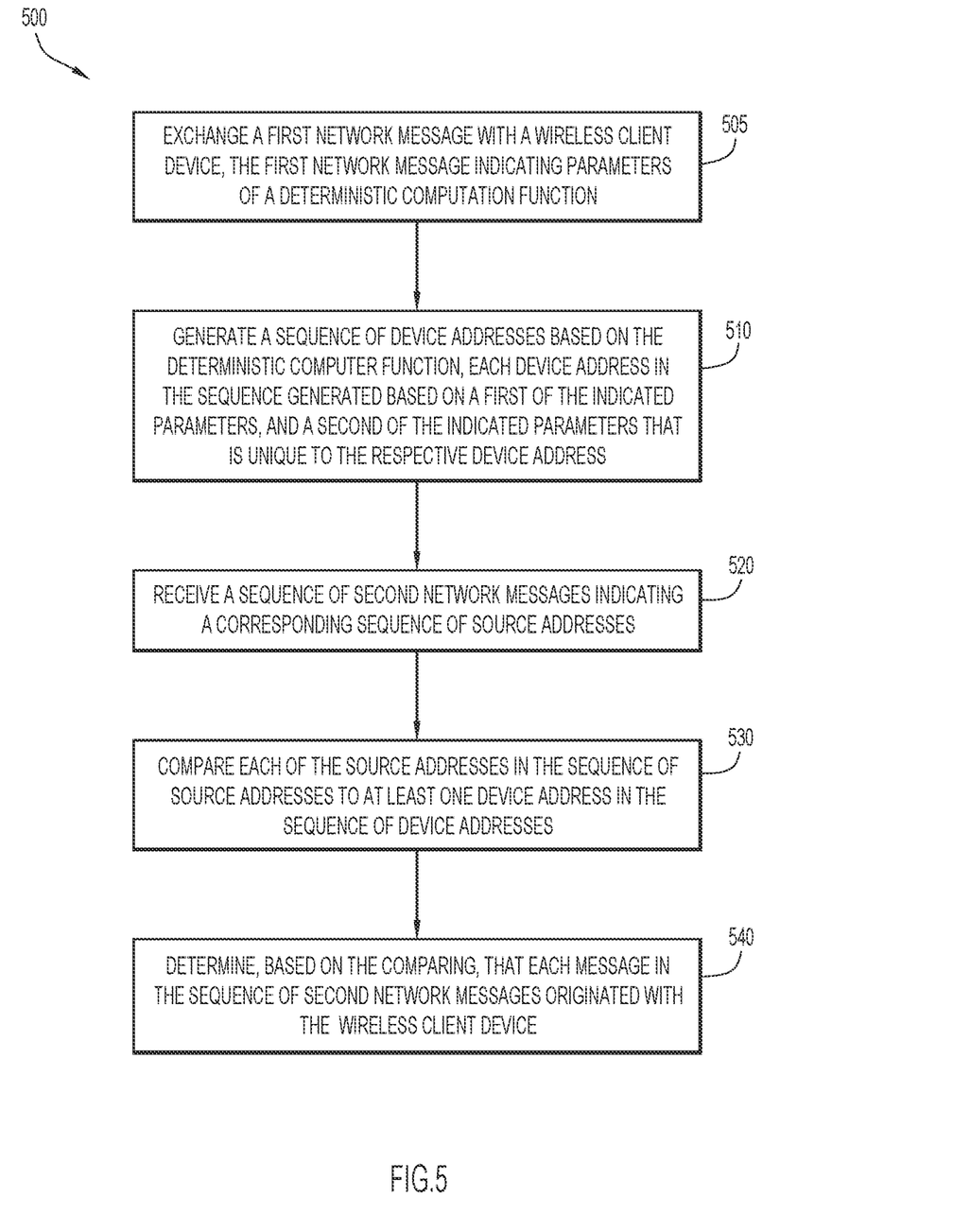
FIG. 5 is a flowchart of a method of collaborative device address rotation in accordance with an example embodiment.

FIG. 5 is a flowchart of a method of collaborative device address rotation in accordance with an example embodiment. For example, as discussed above, some of the disclosed embodiments provide that a wireless client device and a network infrastructure component independently generate an equivalent sequence of device addresses. This sequence of device addresses is generated, by the wireless client device and network infrastructure component, based on key and moving factor information shared between the two devices. This allows the network infrastructure component to identify the wireless client device when receiving a message that identifies (e.g. via a source address or destination address field of the received message) the wireless client device, via one of the device addresses in the generated sequence. In some embodiments, the method 500 is performed by an access point or a wireless network controller. In the discussion of method 500 below, a device performing the method 500 is referred to as an "executing device."

In operation 505, a first network message is exchanged with a wireless client device. Thus, the executing device receives the first network message in some embodiments of method 500, and transmits the first network message in some other embodiments. The first network message communicates parameters of a deterministic computation function between the wireless client device and the executing device. The parameters are, in some embodiments, to be provided as input to the deterministic computation function. In some embodiments, the deterministic computation function implements an OTP or HMAC OTP algorithm, or other algorithm.

In some embodiments, the indicated parameters of the deterministic computation function include one or more of a key value (e.g., a first indicated parameter), moving factor information, or a rotation interval between the wireless client device and the executing device.

The moving factor information includes, in some embodiments, one or more of a moving factor update function definition, or a moving factor initial value. The moving factor update function definition indicates, in some embodiments, how each of the wireless client device and executing device update the moving factor (e.g. a second indicated parameter) for each generation of a device address. Thus, the parameters indicate a sequence of moving factor values by indicating the update function and/or initial moving factor value. In some embodiments, the moving factor update function definition defines intermediate code (e.g., common intermediate language (CIL), or Java bytecodes) instructions that implement an algorithm to update the moving factor (e.g. receive a previous moving factor value as an input parameter, and generate an updated moving factor value as an output parameter).

In some embodiments, predefined numbers are assigned to indicate different methods of updating a moving factor. For example, a first predefined number indicates the moving factor is a counter value, and is updated by incrementing or decrementing a counter by a predefined constant value. A second predefined number indicates, in some embodiments, the moving factor is derived from a current date/time (e.g. nearest whole minute, etc.). The moving factor initial value is an initial value for a moving factor counter, for example, in some embodiments. Alternatively, the moving factor initial value is an input parameter to the moving factor update function when a first token is generated. An updated value of the moving factor is then determined, in some embodiments, for each device address generated.

In some embodiments, operation 505 includes an authentication of the wireless client device with the executing device. For example, as discussed above, in some embodiments, the executing device interacts with an AAA server to authenticate the wireless client device. In some embodiments, the authentication is performed in accordance with an EAP authentication procedure. In some embodiments, a key derived as part of the authentication process is shared between the wireless client device and the executing device in operation 505. For example, an EAP message carries a key between the wireless client device and the executing device in some embodiments. In some embodiments, this authentication derived key is then used to generate a sequence of device addresses, as described below. Other embodiments generate a key for sharing that is generated independent of the authentication process. In some embodiments, the first network message is exchanged over a secure communication channel that is established via the authentication.

Some embodiments of operation 505 include exchanging a capability indicator with the wireless client device. For example, as discussed above with respect to FIG. 4B, some embodiments implement an IE that indicates whether a particular device supports collaborative address rotation consistent with one or more of the disclosed embodiments. Thus, some embodiments of method 500 include decoding an IE to determine whether the wireless client device supports collaborative address rotation. Performance of operations 510-540 is conditioned, at least in some embodiments, on a result of this decoding. For example, if the wireless client device indicates it does not support collaborative address rotation, an AP or other network infrastructure component performing the method 500 does not generate tokens, or device addresses in the manner described below. In contrast, when the wireless client device indicates (e.g., via an IE) that it does support these methods, operations 510-540 are generally performed as described below, at least in some embodiments of method 500.

In operation 510, a sequence of device addresses is generated. Each device address in the sequence is generated based on a first parameter of the parameters discussed above with respect to operation 505. In some embodiments, the first parameter is a key value. As discussed above, the key value is derived, in some embodiments, as part of an authentication process of the wireless client device. Alternatively, the key value is explicitly communicated via the first network message, which is not necessarily part of the authentication process. In some embodiments, the key is communicated between the wireless client device and the executing device over a secure communication channel, such as a secure communication channel established based on the authentication and, in some cases, an association process that occurs between the wireless client device and the executing device.

In some embodiments, the moving factor is modified or otherwise updated before each device address in the sequence is generated. Thus, in these embodiments, a unique moving factor value is used in the generation of each device address. A device address is generated based on the key and the updated moving factor. Because each device address is generated based on a different moving factor value, the sequence of device addresses are challenging to predict without knowing the key and/or the moving factor value and/or update algorithm.

In some embodiments, each device address in the sequence is based on a different token value. In these embodiments, the key and a unique moving factor value are used to generate each token value. Each token is a number that is not predictable without knowledge of the key and moving factor used to generate it. A format of the token's number does not necessarily conform to a device address format. Thus, some embodiments of operation 510 generate the device address in conformance with a particular device address format by adapting a respective token value (e.g. via a combination of truncation, bit reordering, or other operations on the token value).

In some embodiments, a timing of when each device address in the sequence is generated by the executing device is based, at least in part, on the rotation interval information optionally exchanged between the wireless client device and the executing device. For example, to the extent the executing device predicts, based on the rotation interval information, a time when the wireless client device will rotate its device address to a new device address, the executing device can generate the new device address at a time appropriate for the introduction of the new device address by the wireless client device.

Some embodiments of an executing device generate a predefined number of device address for a particular wireless client device "in advance." Thus, for example, some embodiments generate, for each wireless client device associated with the executing device, a predefined number of device addresses that the respective wireless client device is expected to utilize in the future, based on key and moving factor information specific to the respective wireless client device. When a wireless client device is expected to perform a rotation, based on the rotation interval information, the executing device generates, in these embodiments, a next device address in the sequence. This ensures the executing device maintains a list/pool of expected device addresses of adequate size. Such a design is implemented, in some embodiments, to accommodate unexpected events such as address collisions or network outages, which have a potential to cause a wireless client device to advance through a sequence of device addresses more quickly than would occur under nominal circumstances.

In operation 520, a sequence of second network messages are received. Each of the second network messages indicate a different source address, thus collectively forming a sequence of corresponding source addresses. Note that additional network messages are interspersed within the sequence of second network messages, in at least in some embodiments. Thus, the sequence of second network messages are not necessarily a sequence of contiguously received second network messages.

In operation 530, each of the source addresses in the sequence is compared to at least one device address in the sequence of device addresses. Thus, in other words, when the executing device receives a message that include a source device address, the executing device evaluates the source address to identify from which wireless client device the message originated. Some embodiments of this executing device maintain a set of possible addresses used by each wireless client device in communication with the executing device. Thus, if, for example, an AP is associated with ten wireless client devices, the AP maintains, in some embodiments, ten sets of possible addresses, each set associated with a different single device of the ten wireless client devices. If a received message includes a source address, and the source address is included in one of the ten sets, the AP is able to determine the received message originated from the wireless client device that is associated with the set that includes the matching address.

In an example embodiment, a first network message indicates a source address included in a first set of addresses, and a second network message indicates a source address included in a second set of addresses. Thus, the first network message and second network message originated from two different wireless client devices in this example implementation.

In some cases, each message in a particular sequence of network messages all identify one or more source addresses that are included in the same set of addresses. This indicates that each message in the sequence originated from a single wireless client device. Thus, operation 540 determines, based on the comparing, that each message in the sequence of second network messages originated with the wireless client device.

In some embodiments, the determination that each message in the sequence originated from a common wireless client device effects assignments of network resources to a particular network device, and/or address mappings within the network. For example, in some embodiments, upon determining that a particular device address is associated with a particular wireless client device, a mapping from an (Internet Protocol) IP address to a device address previously used by the wireless client device is updated such that the mapping now maps the IP address to the most recently used device address. In some embodiments, authentication information (e.g., keys, etc.) associated with the previous device address is updated to be associated with the new device address. In some cases, network infrastructure provides address translation between an "over the air" device address, which is subject to rotation, and an "infrastructure" device address that identifies a wireless client device to one or more network nodes outside the wireless network. By determining that each message in the sequence originated from a common wireless client device, some embodiments update a mapping that controls this address translation, such that, for example, a message incoming from an external network that identifies a wireless device via the proper "infrastructure" address is then properly translated to utilize a new "over the air "device address as appropriate.

Some embodiments of method 500 include detecting a collision of a device address used by at least two different wireless client devices. For example, in some embodiments, a collision is detected via a method analogous to that described in request for comments (RFC) 2462. In some embodiments, detecting a collision includes detecting two different messages, including identical source device addresses, that exhibit different unique device identifiers (e.g. an advertising identifier).

In response to the collision, some embodiments of method 500 update the moving factor value and generate a new device address for use by at least one of the wireless client devices. Thus, a collision can advance selection of a new device address from a sequence of device address so as to effectively replace a colliding device address with a new device address in the sequence. This new device address will, generally, experience a reduced risk of further collision relative to the previous (colliding) device address.

Figure 6:
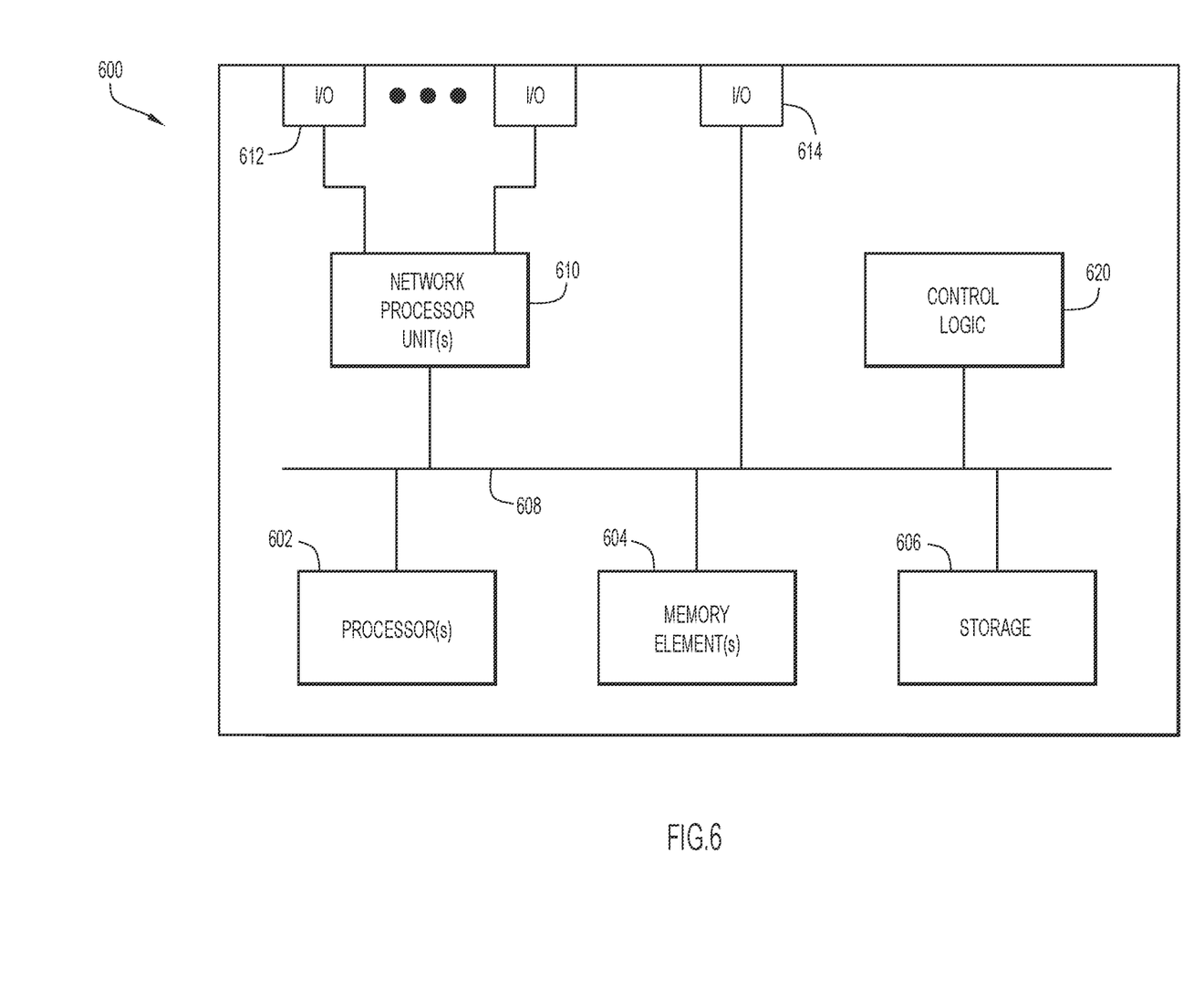
FIG. 6 is a hardware block diagram of a device that may perform functions associated with operations discussed herein in connection with the techniques depicted in any one or more of FIGS. 1-5.

FIG. 6 is a hardware block diagram of a device 600 that may perform functions associated with operations discussed herein in connection with the techniques depicted in any one or more of FIGS. 1-5. In various embodiments, any of the devices described above (e.g., an AP, a wireless network controller, an AAA server, or a DHCP server) implement, in some embodiments, a computing architecture analogous to that described below with respect to the device 600.

In at least one embodiment, the device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for device 600 can overlap in any manner and are not limited to the specific allocation of instructions and/or operations described herein.

In at least one embodiment, processor(s) 602 is/are at least one hardware processor configured to execute various tasks, operations and/or functions for device 600 as described herein according to software and/or instructions configured for device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, physical layer (PHY), controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with device 600, and/or logic configured for memory element(s) 604 and/or storage 606. For example, any logic described herein (e.g., control logic 620) can, in various embodiments, be stored for device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of device 600 to communicate in order to exchange information and/or data. Bus 608 can be implemented with any architecture designed for passing control, data and/or information between processors, memory elements/storage, peripheral devices, and/or any other hardware and/or software components that may be configured for device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between device 600 and other systems, devices, or entities, via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 600 and other systems, devices, or entities to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to device 600. For example, I/O interface(s) 614 may provide a connection to external devices such as a keyboard, keypad, a touch screen, and/or any other suitable input and/or output device now known or hereafter developed. This may be the case, in particular, when the device 600 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display, particularly when the device 600 serves as a user device as described herein.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, compact disc (CD) read only memory (ROM) (CD-ROM), digital video disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., fourth generation (4G)/fifth generation (5G)/next generation (nG), Institute of Electrical and Electronics Engineers (IEEE) 802.11 (e.g., Wi-Fi®/Wi-Fi6®), IEEE 802.15 (e.g. Wireless Personal Area Networks (WPAN)), IEEE 802.16 (e.g., Worldwide Interoperability for Microwave Access (WiMAX)), Radio-Frequency Identification (RFID), Near Field Communication (NFC), Bluetooth™, millimeter (mm).wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided that includes exchanging a first network message with a wireless client device, the first network message indicating parameters to be provided as input to a deterministic computation function, generating a sequence of device addresses using the deterministic computation function, each of the device addresses in the sequence generated based on a first of the indicated parameters, and a respective second of the indicated parameters that is unique to the device address, receiving a sequence of second network messages indicating a corresponding sequence of source addresses, comparing each of the source addresses in the sequence of source address to at least one device address in the sequence of device addresses and determining, based on the comparing, that each message in the sequence of second network messages originated with the wireless client device.

In another form, an apparatus is provided that comprises a network interface configured to enable network communications, one or more processors, and one or more memories storing instructions that when executed configure the one or more processors to perform operations comprising exchanging a first network message with a wireless client device, the first network message indicating parameters to be provided as input to a deterministic computation function; generating a sequence of device addresses using the deterministic computation function, each of the device addresses in the sequence generated based on a first of the indicated parameters, and a respective second of the indicated parameters that is unique to the device address; receiving a sequence of second network messages indicating a corresponding sequence of source addresses; comparing each of the source addresses in the sequence of source address to at least one device address in the sequence of device addresses and determining, based on the comparing, that each message in the sequence of second network messages originated with the wireless client device.

The methods presented herein may be embodied in a non-transitory computer readable storage medium comprising instructions that when executed configure one or more processors to perform the operations of the method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:
1. A method comprising:
exchanging a first network message with a wireless client device, the first network message indicating parameters to be provided as input to a deterministic computation function and the parameters including moving factor value information for performing a periodic or randomized address rotation for the wireless client device;
generating a sequence of device addresses using the deterministic computation function, each of the device addresses in the sequence generated based on a first of the indicated parameters, and a respective second of the indicated parameters that is unique to the device address;
receiving a sequence of second network messages indicating a corresponding sequence of source addresses;
comparing each of the source addresses in the sequence of source address to at least one device address in the sequence of device addresses; and
determining, based on the comparing, that each message in the sequence of second network messages originated with the wireless client device.

2. The method of claim 1, wherein the first network message is an Extensible Authentication Protocol (EAP) message, and the generating of the sequence of device addresses is based on the moving factor value information and a key established during an EAP authentication including the EAP message.

3. The method of claim 2, further comprising exchanging an update function definition with the wireless client device, and updating a moving factor value based on the update function definition.

4. The method of claim 3, wherein modifying the moving factor value based on the update function definition comprises incrementing or decrementing a counter to determine an updated value of the moving factor value.

5. The method of claim 1, further comprising communicating a periodicity of address rotation with the wireless client device, wherein the generating of the sequence of device addresses is based on the periodicity of address rotation.

6. The method of claim 1, wherein the first network message indicates an initial moving factor value, and the generating of the sequence of device addresses is based on the initial moving factor value.

7. The method of claim 1, wherein the moving factor value information indicates a process or a function to define a moving factor value that is the input to the deterministic computation function.

8. An apparatus comprising:
a network interface configured to enable network communications;
one or more processors; and
one or more memories storing instructions that when executed configure the one or more processors to perform operations comprising:
exchanging a first network message with a wireless client device, the first network message indicating parameters to be provided as input to a deterministic computation function and the parameters including moving factor value information for performing a periodic or randomized address rotation for the wireless client device;
generating a sequence of device addresses using the deterministic computation function, each of the device addresses in the sequence generated based on a first of the indicated parameters, and a respective second of the indicated parameters that is unique to the device address;
receiving a sequence of second network messages indicating a corresponding sequence of source addresses;

comparing each of the source addresses in the sequence of source address to at least one device address in the sequence of device addresses; and determining, based on the comparing, that each message in the sequence of second network messages originated with the wireless client device.

9. The apparatus of claim 8, the operations further comprising associating a network resource with each of the source addresses based on the determining.

10. The apparatus of claim 8, wherein the first network message is an Extensible Authentication Protocol (EAP) message and the generating of the sequence of device addresses is based on the moving factor value information and a key established during an EAP authentication including the EAP message.

11. The apparatus of claim 10, the operations further comprising exchanging an update function definition with the wireless client device, and updating a moving factor value based on the update function definition.

12. The apparatus of claim 11, wherein modifying the moving factor value based on the update function definition comprises incrementing or decrementing a counter to determine an updated value of the moving factor value.

13. The apparatus of claim 8, the operations further comprising communicating a periodicity of address rotation with the wireless client device, wherein the generating of the sequence of device addresses is based on the periodicity of address rotation.

14. The apparatus of claim 8, wherein the first network message indicates an initial moving factor value, and the generating of the sequence of device addresses is based on the initial moving factor value.

15. The apparatus of claim 8, the operations further comprising detecting a collision of a device address of the sequence of device addresses, and generating a next device address in the sequence of device addresses in response to the detecting.

16. The apparatus of claim 8, the operations further comprising decoding a capability indicator from an information element received from the wireless client device, wherein the exchanging of the network message is based on the capability indicator.

17. A non-transitory computer readable storage medium comprising instructions that when executed configure one or more processors to perform operations, comprising:

exchanging a first network message with a wireless client device, the first network message indicating parameters to be provided as input to a deterministic computation function and the parameters including moving factor value information for performing a periodic or randomized address rotation for the wireless client device;

generating a sequence of device addresses using the deterministic computation function, each of the device addresses in the sequence generated based on a first of the indicated parameters, and a respective second of the indicated parameters that is unique to the device address;

receiving a sequence of second network messages indicating a corresponding sequence of source addresses;

comparing each of the source addresses in the sequence of source address to at least one device address in the sequence of device addresses; and determining, based on the comparing, that each message in the sequence of second network messages originated with the wireless client device.

18. The non-transitory computer readable storage medium of claim 17, wherein the first network message is an Extensible Authentication Protocol (EAP) message, and the generating of the sequence of device addresses is based on the moving factor value information and a key established during an EAP authentication including the EAP message.

19. The non-transitory computer readable storage medium of claim 18, the operations further comprising exchanging an update function definition with the wireless client device, and updating a moving factor value based on the update function definition.

20. The non-transitory computer readable storage medium of claim 19, wherein modifying the moving factor value based on the update function definition comprises incrementing or decrementing a counter to determine an updated value of the moving factor value.

* * * * *